United States Patent
Iaquinto et al.

(10) Patent No.: US 6,184,935 B1
(45) Date of Patent: Feb. 6, 2001

(54) UPSAMPLING FILTER AND HALF-PIXEL GENERATOR FOR AN HDTV DOWNCONVERSION SYSTEM

(75) Inventors: Michael Iaquinto, Horsham, PA (US); Hee-Yong Kim, Plainsboro, NJ (US); Edwin Robert Meyer, Bensalem, PA (US); Ren Egawa, Princeton, NJ (US)

(73) Assignee: Matsushita Electric Industrial, Co. Ltd., Osaka (JP)

( * ) Notice: Under 35 U.S.C. 154(b), the term of this patent shall be extended for 0 days.

(21) Appl. No.: 09/180,081

(22) PCT Filed: Mar. 11, 1998

(86) PCT No.: PCT/US98/04757

§ 371 Date: Mar. 29, 1999

§ 102(e) Date: Mar. 29, 1999

(87) PCT Pub. No.: WO98/41029

PCT Pub. Date: Sep. 17, 1998

Related U.S. Application Data
(60) Provisional application No. 60/040,517, filed on Mar. 12, 1997.

(51) Int. Cl.[7] ........................................................ H04N 7/26
(52) U.S. Cl. ............................ 348/441; 348/458; 348/416
(58) Field of Search ..................................... 348/409, 416, 348/581, 458, 402, 565, 720, 714, 718, 441; 371/49.1

(56) References Cited

U.S. PATENT DOCUMENTS

| | | |
|---|---|---|
| 3,997,772 | 12/1976 | Crochiere et al. . |
| 4,468,688 | 8/1984 | Gabriel et al. . |
| 4,472,732 | 9/1984 | Bennett et al. . |
| 4,472,785 | 9/1984 | Kasuga . |
| 4,536,745 | 8/1985 | Yamaguchi et al. . |
| 4,631,750 | 12/1986 | Gabriel et al. . |
| 4,652,908 | 3/1987 | Fling et al. . |
| 4,774,581 | 9/1988 | Shiratsuchi . |
| 4,870,661 | 9/1989 | Yamada et al. . |

(List continued on next page.)

FOREIGN PATENT DOCUMENTS

0707426A2    4/1996   (EP) .

OTHER PUBLICATIONS

Jill Boyce, John Henderson and Larry Pearlstein, "SDTV Receivers With HDTV Decoding Capability," ACATS Technical Subgroup Meeting, May 18, 1995, Washington, D.C., (18 pp).

K. Blair Benson, revised by Jerry Whitaker, "Television Engineering Handbook," (Revised copyright 1992, 1986 by McGraw–Hill, Inc., (7 pp.).

Jill Boyce and Larry Pearlstein "Low–Cost All Format ATV Decoding With Improved Quality" 30th Advanced Motion Imaging Conference, Paper #11, Feb. 2, 1996 (7 pp.).

(List continued on next page.)

*Primary Examiner*—Victor R. Kostak
(74) *Attorney, Agent, or Firm*—Ratner & Prestia

(57) ABSTRACT

A video down conversion system compliant with the Advanced Television Systems Standard (ATSC) includes a decoder which decodes a Main Profile, High Level (MP@HL) image and employs a downconversion processor to produce a standard definition video signal. The system stores a subsampled image in order to reduce memory requirements and employs an upsampling filter to generate reference image data from the stored subsampled image. The reference image data spatially correspond to the image data produced by the video decoder before it is subsampled. The upsampling filter uses different filter coefficients based on the subsampling phase of the stored image and the half-pixel indicator in the motion vector which is used to locate the downsampled reference image data in the stored subsampled image.

9 Claims, 7 Drawing Sheets

U.S. PATENT DOCUMENTS

| | | |
|---|---|---|
| 4,908,874 | 3/1990 | Gabriel . |
| 5,057,911 | 10/1991 | Stec et al. . |
| 5,262,854 | 11/1993 | Ng . |
| 5,274,372 | 12/1993 | Luthra et al. . |
| 5,327,235 | 7/1994 | Richards . |
| 5,331,346 | 7/1994 | Shields et al. . |
| 5,351,086 * | 9/1994 | Park ................................. 348/402 |
| 5,386,234 * | 1/1995 | Veltman et al. ................ 348/409 |
| 5,386,241 * | 1/1995 | Park ................................. 348/565 |
| 5,389,923 | 2/1995 | Iwata et al. . |
| 5,469,223 * | 11/1995 | Kimura ............................ 348/581 |
| 5,481,553 * | 1/1996 | Suzuki et al. .................... 371/49.1 |
| 5,481,568 | 1/1996 | Yada . |
| 5,483,474 | 1/1996 | Arbeiter et al. . |
| 5,489,903 | 2/1996 | Wilson et al. . |
| 5,528,301 | 6/1996 | Hau et al. . |
| 5,581,302 | 12/1996 | Ran et al. . |
| 5,613,084 | 3/1997 | Hau . |
| 5,737,019 | 4/1998 | Kim . |
| 5,796,438 * | 8/1998 | Hosono ............................. 348/581 |
| 5,825,424 * | 10/1998 | Canfield et al. .................. 348/416 |

OTHER PUBLICATIONS

Jack S. Fuhrer, "The All Format Decoder", Hitachi America, Ltd., Jun. 3, 1996.

"Recommended Practices For Video Encoding Using The ATSC Digital Television Standard–Consideration of Down-sampling Decoders", Jun. 3, 1996 (6 pp.).

Larry Pearlstein "Discussion On Recommended Practices For North American ATV Coding", Hitachi America Ltd., Presented to SMPTE WG TVCM, Mar. 8, 1996 (8 pp.).

Data Sheet "GP9101 High Performance Multirate Digital Filter", Gennum Corporation, Jan. 1994 (21 pp.).

Marco Winzker, Peter Pirsch, Jochen Reimers, "Architecture And Memory Requirements For Stand Alone Hierarchial MPEG2 HDTV–Decoders With Synchronous DRAMS", pp. 609–612, IEEE, Apr. 30, 1995.

International Search Report, Jun. 23, 1998.

\* cited by examiner

FIG. 4A

UPSAMPLING FILTER AND HALF-PIXEL GENERATOR FOR AN HDTV DOWNCONVERSION SYSTEM

This patent application claims the benefit of U.S. Provisional Application No. 60/040,517 filed Mar. 12, 1997.

The entire disclosure of U.S. Provisional Application No. 60/040,517 is expressly incorporated herein by reference.

FIELD OF THE INVENTION

This invention relates to a decoder for receiving, decoding and conversion of frequency domain encoded signals, e.g. MPEG-2 encoded video signals, into standard output video signals, and more specifically to an upsampling and half-pixel generator of a decoder which converts an encoded high resolution video signal to a decoded lower resolution output video signal.

BACKGROUND OF THE INVENTION

In the United States a standard, the Advanced Television System Committee (ATSC) standard defines digital encoding of high definition television (HDTV) signals. A portion of this standard is essentially the same as the MPEG-2 standard, proposed by the Moving Picture Experts Group (MPEG) of the International Organization for Standardization (ISO). The standard is described in an International Standard (IS) publication entitled, "Information Technology—Generic Coding of Moving Pictures and Associated Audio, Recommendation H.626", ISO/IEC 13818-2, IS, 11/94 which is available from the ISO and which is hereby incorporated by reference for its teaching on the MPEG-2 digital video coding standard.

The MPEG-2 standard is actually several different standards. In MPEG-2 several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level is intended for coding high-definition television images. Images encoded according to the Main Profile, High Level standard may have as many as 1,152 active lines per image frame and 1,920 pixels per line.

The Main Profile, Main Level standard, on the other hand, defines a maximum picture size of 720 pixels per line and 567 lines per frame. At a frame rate of 30 frames per second, signals encoded according to this standard have a data rate of 720*567*30 or 12,247,200 pixels per second. By contrast, images encoded according to the Main Profile, High Level standard have a maximum data rate of 1,152*1,920*30 or 66,355,200 pixels per second. This data rate is more than five times the data rate of image data encoded according to the Main Profile Main Level standard. The standard for HDTV encoding in the United States is a subset of this standard, having as many as 1,080 lines per frame, 1,920 pixels per line and a maximum frame rate, for this frame size, of 30 frames per second. The maximum data rate for this standard is still far greater than the maximum data rate for the Main Profile, Main Level standard.

The MPEG-2 standard defines a complex syntax which contains a mixture of data and control information. Some of this control information is used to enable signals having several different formats to be covered by the standard. These formats define images having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in five layers, the sequence layer, the group of pictures layer, the picture layer, the slice layer, and the macroblock layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

Format conversion of encoded high resolution Main Profile, High Level pictures to lower resolution Main Profile, High Level pictures; Main Profile, Main Level pictures, or other lower resolution picture formats, has gained increased importance for a) providing a single decoder for use with multiple existing video formats, b) providing an interface between Main Profile, high level signals and personal computer monitors or existing consumer television receivers, and c) reducing implementation costs of HDTV. For example, conversion allows replacement of expensive high definition monitors used with Main Profile, High Level encoded pictures with inexpensive existing monitors which have a lower picture resolution to support, for example, Main Profile, Main Level encoded pictures, such as NTSC or 525 progressive monitors. One aspect, down conversion, converts a high definition input picture into lower resolution picture for display on the lower resolution monitor.

To effectively receive the digital images, a decoder should process the video signal information rapidly. To be optimally effective, the decoding systems should be relatively inexpensive and yet have sufficient power to decode these digital signals in real time. Consequently, a decoder which supports conversion into multiple low resolution formats must minimize processor memory.

The MPEG-2 Main Profile standard defines a sequence of images in five levels: the sequence level, the group of pictures level, the picture level, the slice level, and the macroblock level. Each of these levels may be considered to be a record in a data stream, with the later-listed levels occurring as nested sub-levels in the earlier listed levels. The records for each level include a header section which contains data that is used in decoding its sub-records.

Each macroblock of the encoded HDTV signal contains six blocks and each block contains data representing 64 respective coefficient values of a discrete cosine transform (DCT) representation of 64 picture elements (pixels) in the HDTV image.

In the encoding process, the pixel data may be subject to motion compensated differential coding prior to the discrete cosine transformation and the blocks of transformed coefficients are further encoded by applying run-length and variable length encoding techniques. A decoder which recovers the image sequence from the data stream reverses the encoding process. This decoder employs an entropy decoder (e.g. a variable length decoder), an inverse discrete cosine transform processor, a motion compensation processor, and an interpolation filter.

FIG. 1 is a high level block diagram of a typical video decoding system of the prior art which processes an MPEG-2 encoded picture. The general methods used to decode an MPEG-2 encoded picture, without subsequent processing, downconversion or format conversion, are specified by the MPEG-2 standard. The video decoding system includes an entropy decoder (ED) 110, which may include variable length decoder (VLD) 210 and run length decoder 212. The system also includes an inverse quantizer 214, and inverse discrete cosine transform (IDCT) processor 218. A controller 207 controls the various components of the decoding system responsive to the control information retrieved from the input bit stream by the ED 110. For processing of prediction images, the system further includes a memory 199 having reference frame memory 222, summing network 230, and motion compensation processor 206a which may have a motion vector processor 221 and half-pixel generator 228.

The ED 110 receives the encoded video image signal, and reverses the encoding process to produce macroblocks of quantized frequency-domain (DCT) coefficient values and control information including motion vectors describing the relative displacement of a matching marcoblock in a previously decoded image which corresponds to a macroblock of the predicted picture that is currently being decoded. The Inverse Quantizer 214 receives the quantized DCT transform coefficients and reconstructs the quantized DCT coefficients for a particular macroblock. The quantization matrix to be used for a particular block is received from the ED 110.

The IDCT processor 218 transforms the reconstructed DCT coefficients to pixel values in the spatial domain (for each block of 8×8 matrix values representing luminance or chrominance components of the macroblock, and for each block of 8×8 matrix values representing the differential luminance or differential chrominance components of the predicted macroblock).

If the current macroblock is not predictively encoded, then the output matrix values provided by the IDCT processor 218 are the pixel values of the corresponding macroblock of the current video image. If the macroblock is interframe encoded, the corresponding macroblock of the previous video picture frame is stored in memory 199 for use by the motion compensation processor 206. The motion compensation processor 206 receives a previously decoded macroblock from memory 199 responsive to the motion vector, and then adds the previous macroblock to the current IDCT macroblock (corresponding to a residual component of the present predictively encoded frame) in summing network 230 to produce the corresponding macroblock of pixels for the current video image, which is then stored into the reference frame memory 222 of memory 199.

SUMMARY OF THE INVENTION

The present invention is embodied in an upsampling filter for a digital video signal down conversion system. The downconversion system decodes a digitally encoded video signal representing a video image and decimates the decoded signal to produce a subsampled image signal. This subsampled signal is stored for use in decoding a subsequently received encoded image signal which is encoded as differential pixel values relative to the earlier decoded image. When a subsequent image signal representing differential pixel values is received and decoded, segments of the stored image are retrieved and upsampled, using a filter according to the present invention, to produce decoded image pixel values which may be combined with the decoded differential pixel values to produce a decoded image signal. The upsampling filter according to the present invention includes an upsampling filter having programmable coefficient values and a plurality of filter coefficient sets, each coefficient set corresponding to a distinct subsampling phase. The filter also includes circuitry which receives a motion vector from the encoded image signal, processes the received motion vector to locate the desired segment in the stored image and determines the subsampling phase of the desired segment. In response to this determination, the circuitry retrieves the desired segment from the identified location in the stored image data, programs the filter with the appropriate filter coefficient set and filters the retrieved segment to provide reference image data which matches the decoded differential image data.

According to another aspect of the invention, the motion vectors in the encoded video signal define the location of the desired segment with a resolution of one-half of one pixel position and the plurality of coefficient sets includes a number 2N coefficient sets, where N is the decimation factor applied to the decoded image to produce the subsampled image.

According to another aspect of the invention, the motion vectors in the encoded video signal define the location of the desired segment with a resolution on one-half of one pixel position, the plurality of coefficient sets include a number N coefficient sets, where N is the decimation factor applied to the decoded image to produce the subsampled image, and the filter further include a linear interpolator which averages adjacent pixels in the filtered desired segment to produce output pixel values which are displaced by one-half pixel position from the pixel values of the filtered desired segment.

According to another aspect of the invention, the filter is programmable to decimate the decoded video image by one of a plurality of decimation factors and includes multiple groups of coefficient sets, each group corresponding to one of the plurality of decimation factors.

BRIEF DESCRIPTION OF THE DRAWINGS

These and other features and advantages of the present invention will become apparent from the following detailed description, taken in conjunction with the accompanying drawings, wherein:

FIG. 4A is a pixel chart which illustrates subpixel positions and corresponding predicted pixels for the 3:1 and 2:1 exemplary embodiments of the present invention.

DETAILED DESCRIPTION

The exemplary embodiments of the invention decode conventional HDTV signals which have been encoded according to the MPEG-2 standard and in particular, the Main Profile High Level (MP@HL) and the Main Profile Main Level (MP@ML) MPEG-2 standards, and provides the decoded signals as video signals having a lower resolution than that of the received HDTV signals having a selected one of multiple formats.

Downconversion Decoder

Figure 1:
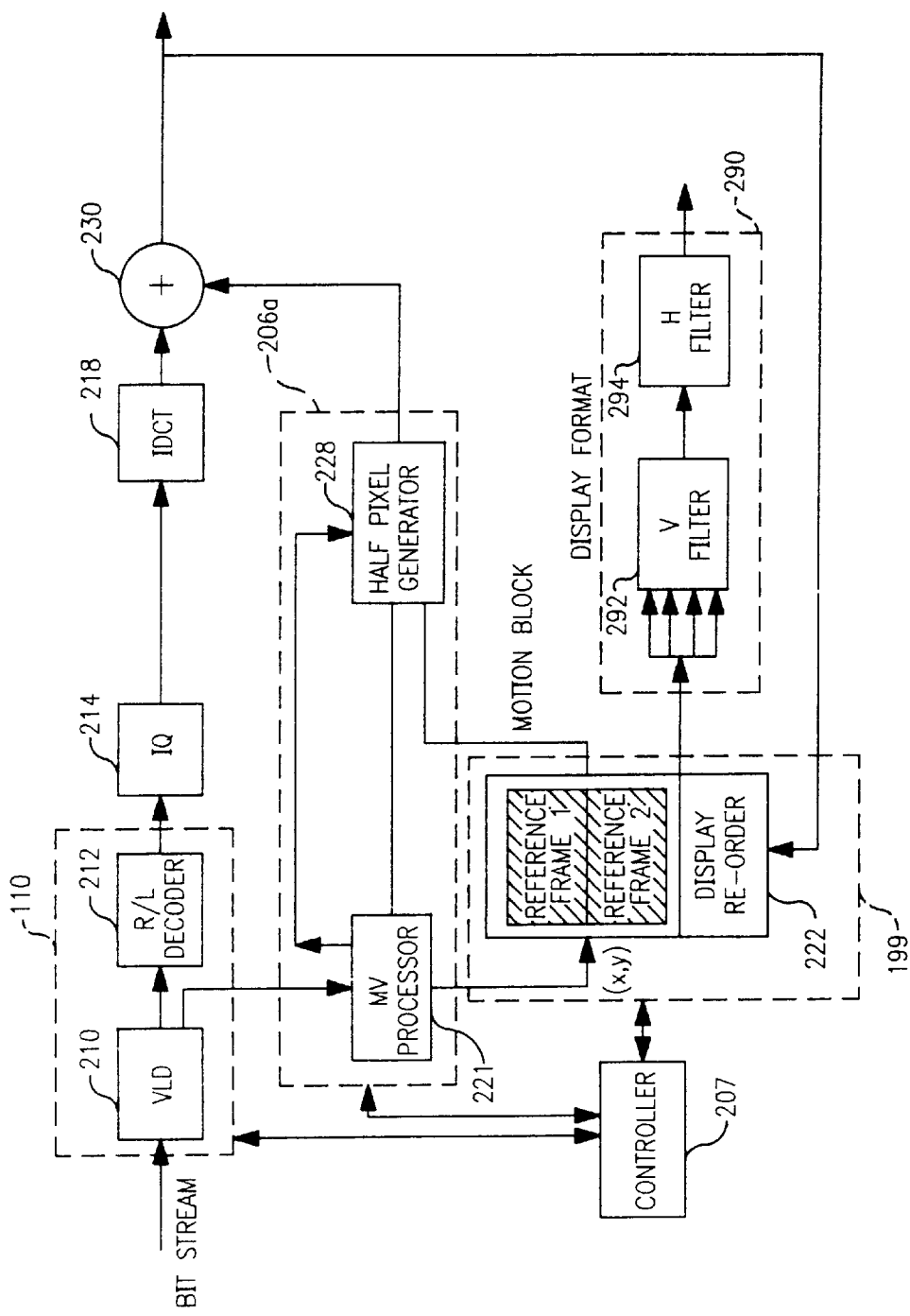
FIG. 1 is a high level block diagram of a video decoder of the prior art.
Figure 2:
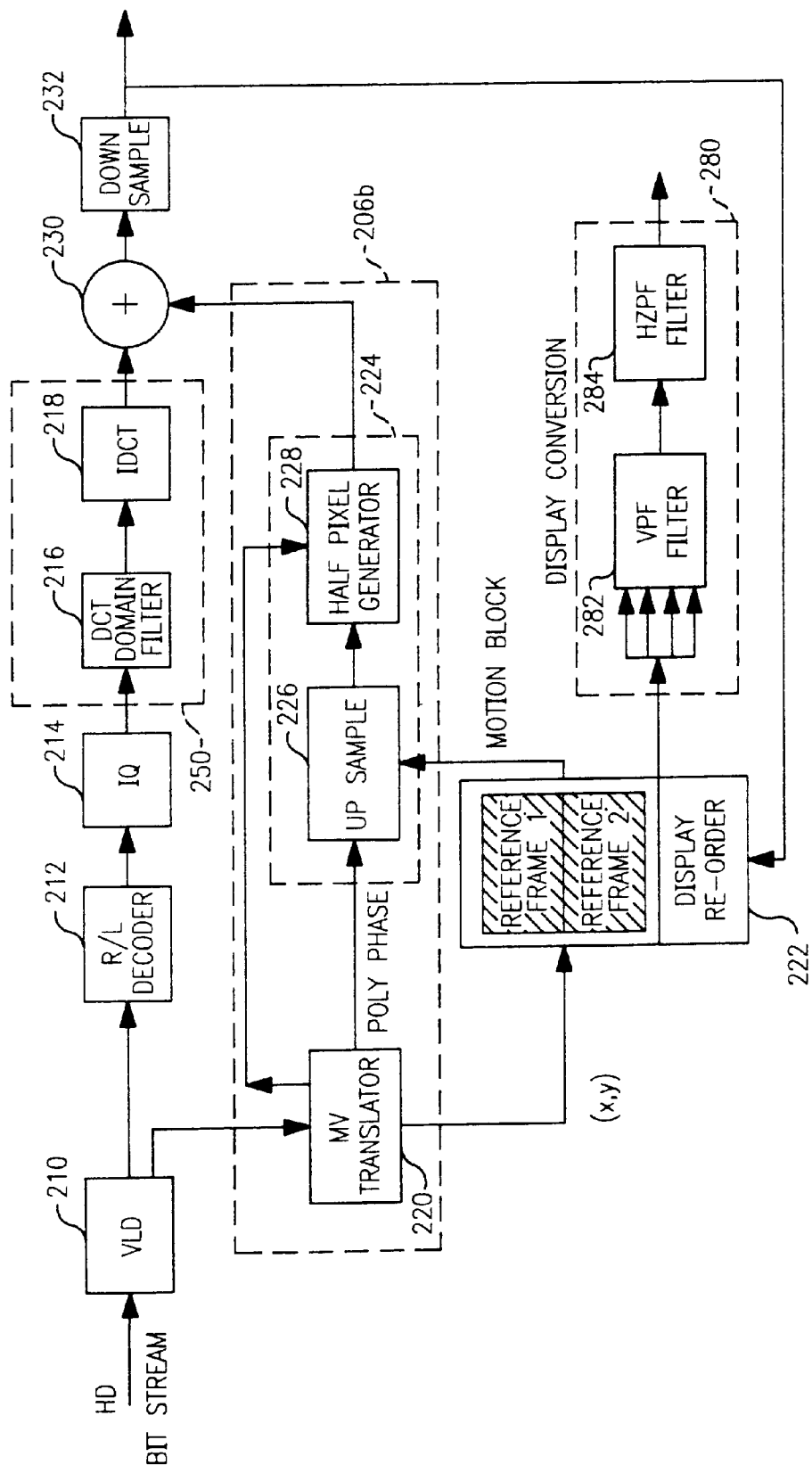
FIG. 2 is a high level block diagram of the down conversion system as employed by an exemplary embodiment of the present invention.

FIG. 2 is a high level block diagram of the down conversion system including one exemplary embodiment of the present invention employing such a DCT filtering operation, and which may be employed by an exemplary embodiment of the present invention. As shown in FIG. 2, the down conversion system includes a variable length decoder (VLD) 210, a run-length (R/L) decoder 212, an inverse quantizer 214, and inverse discrete cosine transform (IDCT) processor 218. In addition, the down conversion system includes a down conversion filter 216 for filtering of encoded pictures and a down sampling processor 232. While the following describes the exemplary embodiment for a MP@HL encoded input, the present invention may be practiced with any similarly encoded high-resolution image bit stream.

The upsampling filter and half-pixel generator employed by the down conversion system in accordance with the present invention includes an up-sampling processor 226, half-pixel generator 228, and employs a reference frame memory 222. The downconversion system also includes a motion compensation processor 206 including a motion vector MV) translator 220 and a motion block generator 224

The system of FIG. 2 also includes a display conversion block 280 having a vertical programmable filter (VPF) 282 and horizontal programmable filter (HZPF) 284. The display conversion block 280 converts downsampled images into images for display on a particular display device having a lower resolution that the original image.

The down conversion filter 216 performs a low-pass filtering of the high resolution (e.g. Main Profile, High Level DCT) coefficients in the frequency domain. The down sampling process 232 eliminates spatial pixels by decimation of the filtered Main Profile, High Level picture to produce a set of pixel values which can be displayed on a monitor having lower resolution than that required to display a MP@HL picture. The exemplary reference frame memory 222 stores the spatial pixel values corresponding to at least one previously decoded reference frame having a resolution corresponding to the down-sampled picture. For interframe encoding, the MV translator 220 scales the motion vectors for each block of the received picture consistent with the reduction in resolution, and the High Resolution motion block generator 224 receives the low resolution motion blocks provided by the reference frame memory 222, upsamples these motion blocks and performs half-pixel interpolation as needed to provide motion blocks which have pixel positions that correspond to the decoded and filtered differential pixel blocks.

Note that in the down conversion system of FIG. 2 the downsampled images are stored rather than high definition images, resulting in a considerable reduction of memory required for storing reference images.

The operation of an exemplary down-conversion system of the present invention for intra-frame encoding is now described. The MP@HL bit-stream is received and decoded by VLD 210. In addition to header information used by the HDTV system, the VLD 210 provides DCT coefficients for each block and macroblock, and motion vector information. The DCT coefficients are run length decoded in the R/L decoder 212 and inverse quantized by the inverse quantizer 214.

Since the received video image represented by the DCT coefficients is a high resolution picture, the exemplary embodiment of the present invention employs low-pass filtering of the DCT coefficients of each block before decimation of the high resolution video image. The inverse quantizer 214 provides the DCT coefficients to the DCT filter 216 which performs a low-pass filtering in the frequency domain by weighting the DCT coefficients with predetermined filter coefficient values before providing them to the IDCT processor 218. For one exemplary embodiment of the present invention, this filter operation is performed on a block by block basis.

The IDCT processor 218 provides spatial pixel sample values by performing an inverse discrete cosine transform of the filtered DCT coefficients. The down sampling processor 232 reduces the picture sample size by eliminating spatial pixel sample values according to a predetermined decimation ratio; therefore, storing the lower resolution picture uses a smaller frame memory compared to that which would be needed to store the higher resolution MP@HL picture.

The operation of an exemplary embodiment of the downconversion system of the present invention for predicted frames of the encoding standard is now described. In this example, the current received image DCT coefficients represent the DCT coefficients of the residual components of the predicted image macroblocks. In the described exemplary embodiment, the horizontal components of the motion vectors for a predicted frame are scaled since the low resolution reference pictures of previous frames stored in memory do not have the same number of pixels as the high resolution predicted frame (MP@HL).

Referring to FIG. 2, the motion vectors of the MP@HL bit stream provided by the VLD 210 are provided to the MV translator 220. Each motion vector is scaled by the MV translator 220 to reference the appropriate prediction block of the reference frame of a previous image stored in reference frame memory 222. The size (number of pixel values) in the retrieved block is smaller than block provided by the IDCT processor 218; consequently, the retrieved block is upsampled to form a prediction block having the same number of pixels as the residual block provided by the IDCT processor 218 before the blocks are combined by the summing network 230.

The prediction block is upsampled by the up-sampling processor 226 responsive to a control signal from the MV translator 220 to generate a block corresponding to the original high resolution block of pixels, and then half pixel values are generated—if indicated by the motion vector for the up-sampled prediction block in the Half Pixel Generator 228—to ensure proper spatial alignment of the prediction block. The upsampled and aligned prediction block is added in summing network 230 to the current filtered block, which is, for this example, the reduced resolution residual component from the prediction block. All processing is done on a macroblock by macroblock basis. After the motion compensation process is complete for the current high-resolution macroblock, the reconstructed macroblock is decimated accordingly by the down sampling processor 232. This process does not reduce the resolution of the image but simply removes redundant pixels from the low resolution filtered image.

Down Sampling for Low Resolution Formats

Figure 3A:
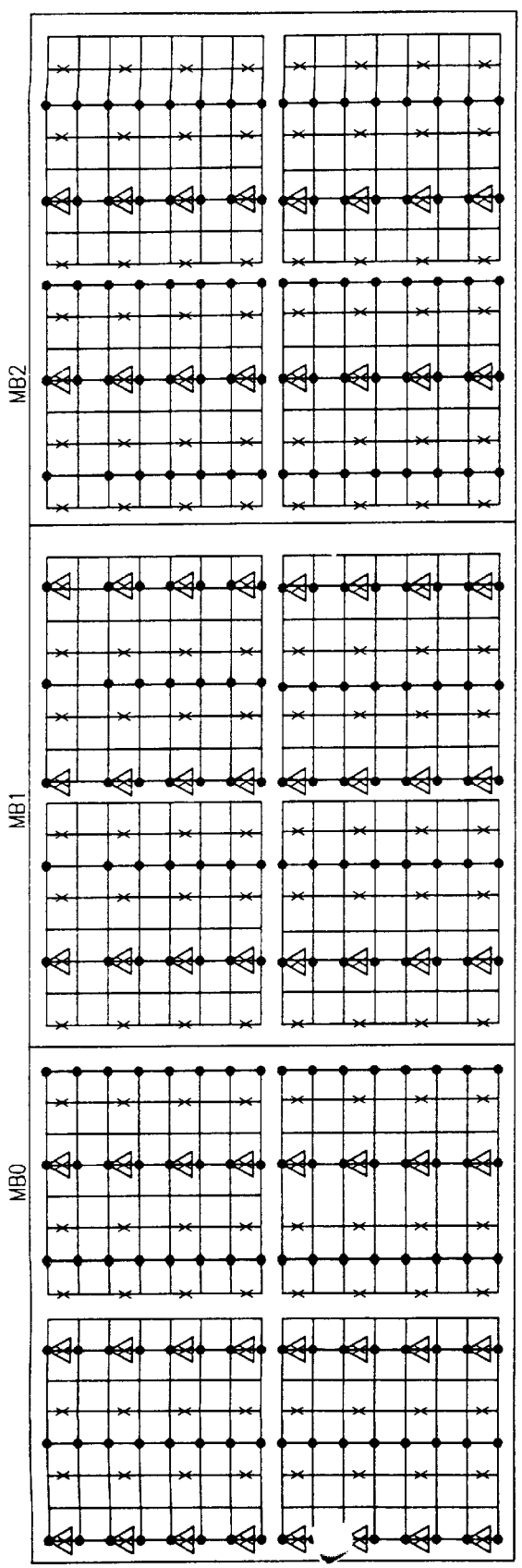
FIG. 3A is a macroblock diagram which shows the input and decimated output pixels for 4:2:0 video signal using 3:1 decimation.
Figure 3B:
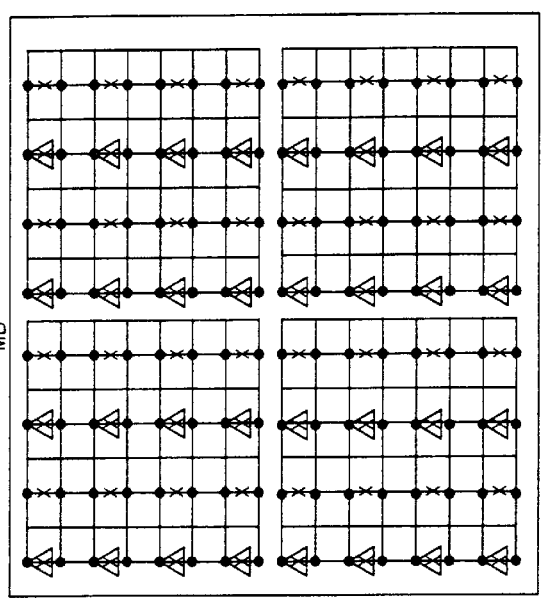
FIG. 3B is a pixel block diagram which shows the input and decimated output pixels for 4:2:0 video signal using 2:1 decimation.

Down sampling is accomplished by the down sampling process 232 of FIG. 2 to reduce the number of pixels in the downconverted image. FIG. 3A shows the input and decimated output pixels for a 4:2:0 signal format for 3:1 decimation. FIG. 3B shows the input and decimated output pixels for 4:2:0 chrominance type 2:1 decimation. Table 1 gives the legend identification for the Luminance and Chrominance pixels of FIG. 3A and FIG. 3B. The pixel positions before and after the down conversion of FIGS. 3A and 3B are the interlaced (3:1 decimation) and progressive (2:1 decimation) cases respectively.

TABLE 1

| Symbol | Pixel |
|---|---|
| + | Luminance Before Decimation |
| × | Chrominance Before Decimation |
| • | Luminance After decimation |
| Δ | Chrominance After Decimation |

For down sampling of the interlaced image, which may be the conversion from a 1920 by 1080 pixel image to a 640 by 1080 pixel horizontally compressed image, two out of every three pixels are decimated on the horizontal axis. For the exemplary 3:1 decimation, there are three different macroblock types after the down conversion process. In FIG. 3A, original macroblocks were denoted by MB0, MB1, MB2. The down sampled luminance pixels in MB0 start at the first pixel in the original macroblock, but in MB1 and MB2 the down-sampled pixels start at the third and the second pixels. Also the number of down-sampled pixels in each macroblock are not the same. In MB0, there are 6 down-sampled pixels horizontally, but 5 pixels in MB1 and MB2. These three MB types are repeating, therefore Modulo 3 arithmetic is to be applied. Table 2 summarizes the number of down-sampling pixels and offsets for each input macroblock MB0, MB1, MB2.

TABLE 2

|  | MB0 | MB1 | MB2 |
|---|---|---|---|
| No. of Down Sampled Luminance Pixels | 6 | 5 | 5 |
| No. of Down Sampled Chrominance Pixels | 3 | 3 | 2 |
| Offset of 1st Down Sampled Luminance Pixel | 0 | 2 | 1 |
| Offset of 1st Down Sampled Chrominance Pixel | 0 | 1 | 2 |

For downsampling of the progressive format image the luminance signal is subsampled for every second sample horizontally. For the chrominance signal, the down-sampled pixel has a spatial position that is one-half pixel below the pixel position in the original image.

Macroblock Prediction for Downconversion

For the exemplary downconversion process, since the reference frames of the previous images are down sized in the horizontal direction, the received motion vectors pointing to these frames may also be translated according to the conversion ratio. The following describes the motion translation for the luminance block in the horizontal direction. One skilled in the art could easily extend the following discussion to motion translation in the vertical direction if desired. Denoting x and y as the current macroblock address in the original image frame, Dx as the horizontal decimation factor and $mv_x$ as the half pixel horizontal motion vector of the original image frame, the address of the top left pixel of the motion block in the original image frame, denoted as XH in the half pixel unit, is given by (1):

$$XH = 2x + mv_x \tag{1}$$

The pixel corresponding to the motion block starts in the down-sampled image, and has an address denoted as x* and y* may be determined using equation (2).

$$x^* = \frac{XH}{2 \cdot Dx}; y^* = y \tag{2}$$

The division of equation (2) is an integer division with truncation.

Because the exemplary filter 216 and down sampling processor 232 only reduce the horizontal components of the image, the vertical component of the motion vector is not affected. For the chrominance data, the motion vector is one-half of a luminance motion vector in the original picture. Therefore, definitions for translating the chrominance motion vector may also use the two equations (1) and (2).

Motion prediction is done by a two step process: first, pixel accuracy motion estimation in the original image frame may be accomplished by upsampling of down-sampled image frame in the Up Sampling processor 226 of FIGS. 2A and 2B, then the half pixel Generator 228 performs a half pixel interpolation by averaging of nearest pixel values.

The reference image data is added to output data provided by the IDCT processor 218. Since the output values of the summing network 230 correspond to an image having a number of pixels consistent with a high resolution format, these values may be downsampled for display on a display having a lower resolution. Downsampling in the down sampling processor 232 is substantially equivalent to subsampling of an image frame, but adjustments may be made based upon the conversion ratio. For example, in the case of 3:1 downsampling, the number of horizontally down-sampled pixels are 6 or 5 for each input macroblock, and the first downsampled pixels are not always first pixel in the input macroblock.

After acquiring the correct motion prediction block from the down-sampled image, upsampling is used to get the corresponding prediction block in the high resolution picture. Consequently, subpixel accuracy in motion block prediction is desirable in the down sampled picture. For example, using 3:1 decimation, it is desirable to have 1/3 (or 1/6) subpixel accuracy in motion prediction for the down-converted picture. The subpixel which is a first pixel required by the motion vector, in addition to the down-sampled motion block, is determined. Then, subsequent subpixel positions are determined using modulo arithmetic as described in the following. The subpixel positions are denoted as $x_s$ as given in equation (3):

$$X_s = \left(\frac{XH}{2}\right) \% (Dx) \tag{3}$$

where "%" represents modulo division.

Figure 4A:
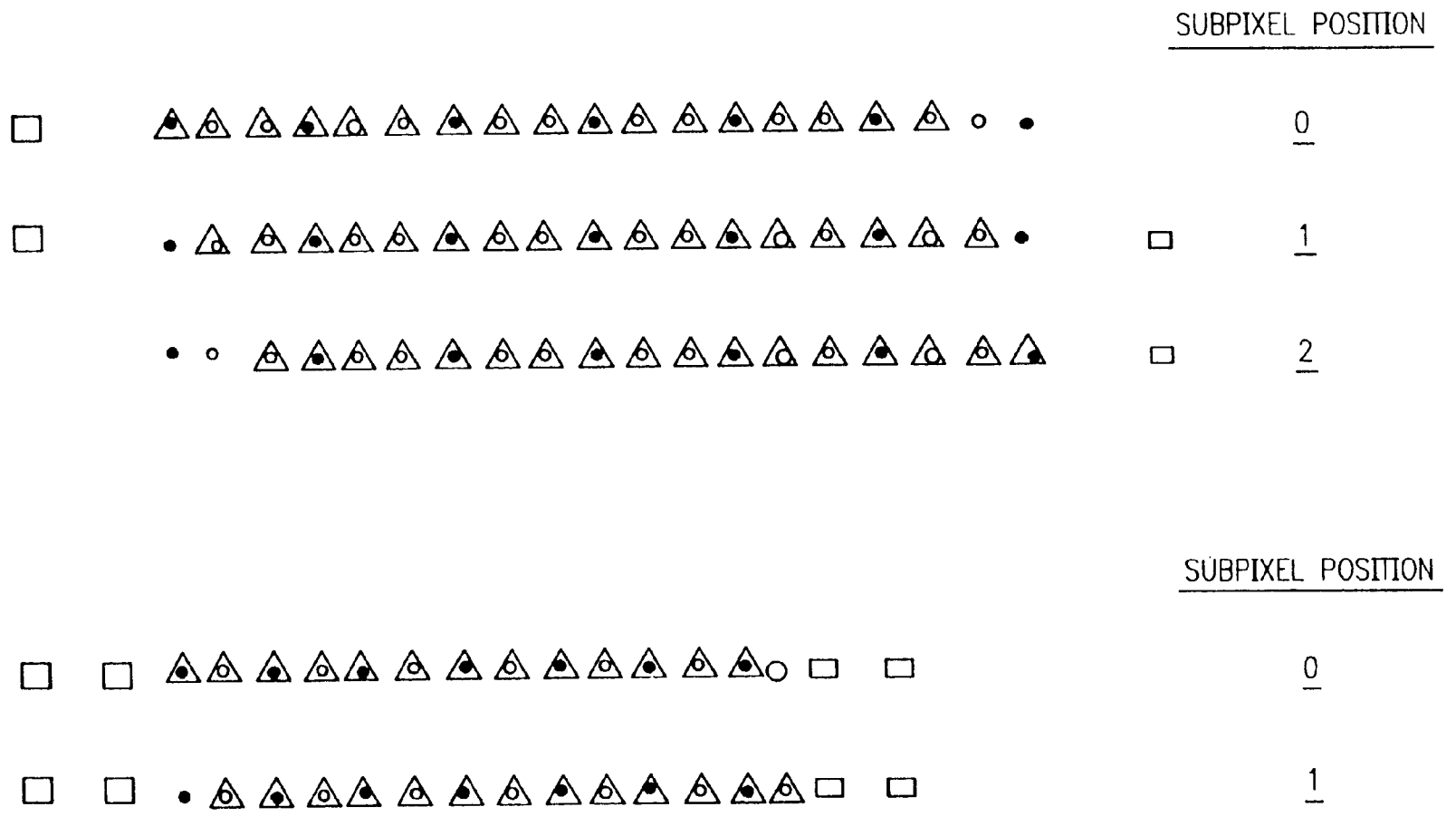

For example, the ranges of $x_s$ are 0, 1, 2 for 3:1 upsampling and 0, 1 for 2:1 upsampling. FIG. 4A shows subpixel positions and corresponding 17 predicted pixels for the 3:1 and 2:1 examples, and Table 3 gives the legend for FIG. 4A.

TABLE 3

| Symbol | Pixel |
| --- | --- |
| • | Downsampled Pixel |
| Δ | Upsampled Pixel |
| ○ | Prediction Pixel |
| □ | Extra Right and Left Pixels for Upsampling |

As previously described, the upsampling filters may be upsampling polyphase filters, and Table 4 gives characteristics of these upsampling polyphase interpolation filters.

TABLE 4

|  | 3:1 Upsampling | 2:1 Upsampling |
| --- | --- | --- |
| Number of Polyphase Filters | 3 | 2 |
| Number of Taps | 3 | 5 |
| Maximum number of horizontal downsampled pixels | 9 | 13 |

Next two tables, Table 5 and Table 6, show polyphase filter coefficients for the exemplary 3:1 and 2:1 upsampling polyphase filters.

TABLE 5

3:1 Upsampling Filter

|  | Phase 0 | Phase 1 | Phase 2 |
| --- | --- | --- | --- |
| Double Precision | −0.1638231735591 | 0.0221080691070 | 0.3737642376078 |
|  | 0.7900589359512 | 0.9557838617858 | 0.7900589359512 |
|  | 0.3737642376078 | 0.0221080691070 | −0.1638231735591 |
| Fixed Point (9 bits) | −0.1640625 (−42) | 0.0234375 (6) | 0.3750000 (96) |
|  | 0.7890625 (202) | 0.95703125 (244) | 0.7890625 (202) |
|  | 0.3750000 (96) | 0.0234375 (6) | −0.1640625 (−42) |

TABLE 6

2:1 Upsampling Filter

|  | Phase 0 | Phase 1 |
| --- | --- | --- |
| Double Precision | 0.0110396839260 | −0.1433363887113 |
|  | 0.0283886402920 | 0.6433363887113 |
|  | 0.9211433515636 | 0.6433363887113 |
|  | 0.0283886402920 | −0.1433363887113 |
|  | 0.0110396839260 | 0.0000000000000 |
| Fixed Point (9 bits) | 0.01718750 (3) | −0.14453125 (−37) |
|  | 0.02734375 (7) | 0.64453125 (165) |
|  | 0.92187500 (236) | 0.64453125 (165) |
|  | 0.02734375 (7) | −0.14453125 (−37) |
|  | 0.01718750 (3) | 0.00000000 (0) |

In a fixed point representation, the numbers in parenthesis of Table 5 and Table 6 are 2's complement representations in 9 bits with the corresponding double precision numbers are on the left. Depending upon the subpixel position of the motion prediction block in the downsampled reference image frame, one corresponding phase of the polyphase interpolation filter is used. Also, for the exemplary embodiment additional pixels on the left and right are used to interpolate 17 horizontal pixels in the original image frame. For example, in the case of 3:1 decimation, a maximum of 6 horizontally downsampled pixels are produced for each input macroblock. However, when upsampling, 9 horizontal pixels are used to produce the corresponding motion prediction block values because an upsampling filter requires more left and right pixels outside of the boundary for the filter to operate. Since the exemplary embodiment employs half pixel motion estimation, 17 pixels are needed to get 16 half pixels which are the average values of nearest two pixel samples. A half pixel interpolator performs the interpolation operation which provides the block of pixels with half-pixel resolution. Table 7A illustrates an exemplary mapping between subpixel positions and polyphase filter elements, and shows a number of left pixels which are needed in addition to the pixels in the upsampled block for the upsampling process.

TABLE 7A

| Sub Pixel Position | Polyphase | No. of Extra Left Pixels | Coordinate Change |
| --- | --- | --- | --- |
| 3:1 Upsampling 0 | 1 | 1 | x* -> x* −1 |
| 1 | 2 | 1 | x* -> x* −1 |
| 2 | 0 | 0 |  |
| 2:1 Upsampling 0 | 0 | 2 | x* -> x* −2 |
| 1 | 1 | 2 | x* -> x* −2 |

Figure 4B:
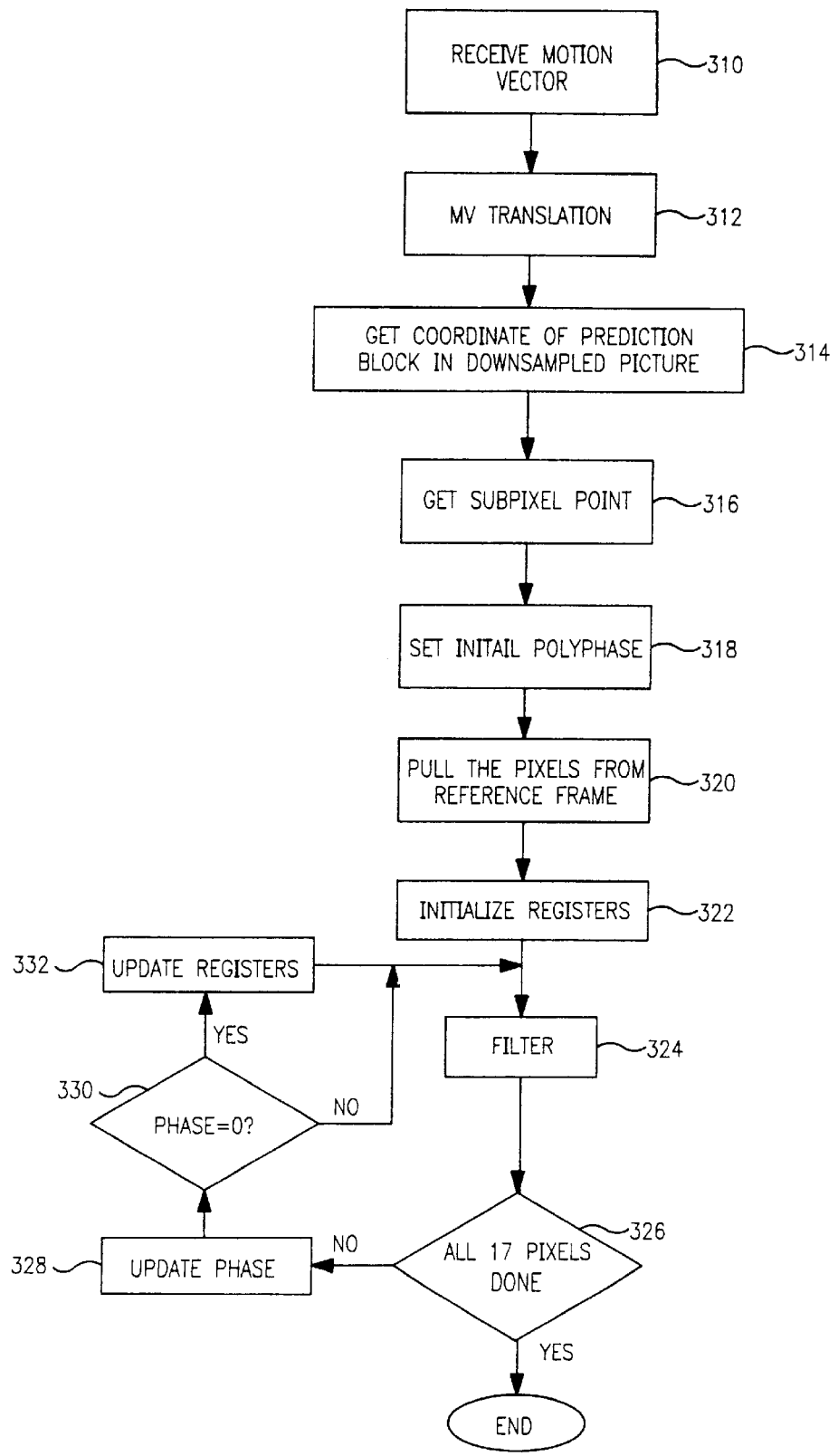
FIG. 4B is a flow-chart diagram which shows the upsampling process which is performed for each row of an input macroblock for an exemplary embodiment of the present invention.

FIG. 4B summarizes the upsampling process which is performed for each row of an input macroblock. First, in step 310, the motion vector for the block of the input image frame being processed is received. At step 312, the motion vector is translated to correspond to the downsampled reference frame in memory. At step 314, the scaled motion vector is used to calculate the coordinates of the reference image block stored in memory 130. At step 316 the subpixel point for the block is determined and the initial polyphase filter values for upsampling are then determined at step 318. The identified pixels for the reference block of the stored downsampled reference frame are then retrieved from memory 130 at step 320.

Before the first pass at the filtering step 324, the registers of the filter may be initialized at step 322, which, for the exemplary embodiment includes the step of loading the registers with the initial 3 or 5 pixel values. Then, after filtering step 324, the process determines, at step 326, whether all pixels have been processed, which for the exemplary embodiment is 17 pixels. If all pixels have been processed, the upsampled block is complete. For an exemplary embodiment, a 17 by 9 pixel block is returned for the upper or lower motion block. If all pixels have not been processed, the phase is updated at step 328, and the phase is checked, for the 0 value. If the phase is zero, the registers are updated for the next set of pixel values. Updating the phase at step 328 updates the phase value to 0, 1, and 2 for the filter loop period for exemplary 3:1 upsampling and to 0, and 1 for the filter loop period for 2:1 upsampling. Where the leftmost pixel is outside of a boundary of the image picture, the first pixel value in the image picture may be repeated.

For an exemplary embodiment, the upsample filtering operation may be implemented in accordance with the following guidelines. First, several factors may be used: 1) the half-pixel motion prediction operation averages two full pixels, and corresponding filter coefficients are also averaged to provide the half-pixel filter coefficient; 2) a fixed number of filter coefficients, five for example, which may be equivalent to the number of filter taps, may be employed regardless of the particular downconversion; 3) five parallel input ports may be provided to the upsampling block for each forward and backward, lower and upper block, with five input pixels LWR(0)–LWR(4) for each clock transition for each reference block being combined with corresponding filter coefficients to provide one output pixel, and 4) the sum of filter coefficients h(0)–h(4) combined with respective pixels LWR(0)–LWR(4) provide the output pixel of the sampling block.

Filter coefficients are desirably reversed because the multiplication ordering is opposite to the normal ordering of filter coefficients, and it may be desirable to zero some coefficients. Table 7B gives exemplary coefficients for the 3:1 upsampling filter, and Table 7C gives exemplary coefficients for the 2:1 upsampling filter:

TABLE 7B

|  | Sub-pixel 0 | Sub-pixel 1 | Sub-pixel 2 | Sub-pixel 3 | Sub-pixel 4 | Sub-pixel 5 |
|---|---|---|---|---|---|---|
| Filter Coeff. | 6 | −18 | −42 | −21 | 96 | 51 |
|  | 244 | 223 | 202 | 149 | 202 | 223 |
|  | 6 | 51 | 96 | 149 | −42 | −18 |
|  | 0 | 0 | 0 | −21 | 0 | 0 |
|  | 0 | 0 | 0 | 0 | 0 | 0 |
| Reference | $x^{*-1}$ | $x^{*-1}$ | $x^{*-1}$ | $x^{*-1}$ | $x^*$ | $x^*$ |
| Phase | 01 | 00 | 10 | 01 | 00 | 10 |
| Half Pixel | 0 | 1 | 0 | 1 | 0 | 1 |

TABLE 7C

|  | Subpixel 0 | Subpixel 1 | Subpixel 2 | Subpixel 3 |
|---|---|---|---|---|
| Filter Coeff. | 3 | 2 | −37 | −17 |
|  | 7 | −15 | 165 | 86 |
|  | 236 | 200 | 165 | 200 |
|  | 7 | 86 | −37 | −15 |
|  | 3 | −17 | 0 | 2 |
| Reference | $x^*-2$ | $x^*-2$ | $x^*-1$ | $x^*-1$ |
| Phase | 00 | 00 | 01 | 01 |
| Half Pixel | 0 | 1 | 0 | 1 |

In Tables 7B and 7C, $x$ is the downsampled pixel position defined in equations (1) and (2), and subpixel position, $x_s$, is redefined from equation (3) as equation (3')

$$x_s = (XH)$$

$$(2Dx) \qquad (3')$$

For chrominance values of the exemplary implementation, XH is scaled by two and equations (1),(2) and (3') are applied. In one embodiment, phase and half pixel information (coded as two bits and one bit, respectively) is used by motion compensation processor 220 and half-pixel generator 228 of FIG. 2B. For example, reference block pixels are provided as U pixels first, V pixels next, and finally Y pixels. U and V pixels are clocked in for 40 cycles and Y pixels are clocked in for 144 cycles. Reference blocks may be provided for 3:1 decimation by providing the first five pixels, repeating twice, shifting the data by one, and repeating until a row is finished. The same method may be used for 2:1 decimation except that it is repeated once rather than twice. Input pixels are repeated since decimation follows addition of the output from motion compensation and half-pixel generation with the residual value. Consequently, for 3:1 decimation, two of three pixels are deleted, and dummy pixels for these pixel values do not matter.

DCT Domain Filtering Employing Weighting of DCT Coefficients

The exemplary embodiment of the present invention is employed with the DCT filter 216 of FIG. 2 which processes the DCT coefficients in the frequency domain, replacing a low-pass filter operation in the spatial domain. There are several advantages in DCT domain filtering instead of spatial domain filtering for DCT coded pictures, such as contemplated by the MPEG or JPEG standards. Most notably, a DCT domain filter is computationally more efficient and requires less hardware than a spatial domain filter applied to the spatial pixel sample values. For example, a spatial filter having N taps may use as many as N additional multiplications and additions for each spatial pixel sample value. This compares to only one additional multiplication in the DCT domain filter.

The simplest DCT domain filter of the prior art is a truncation of the high frequency DCT coefficients. However, truncation of high frequency DCT coefficients does not result in a smooth filter and has drawbacks such as "ringing" near edges in the decoded picture. The DCT domain low-pass filter of the exemplary embodiment of the present invention is derived from a block mirror filter in the spatial domain. The filter coefficient values for the block mirror filter are, for example, optimized by numerical analysis in the spatial domain, and these values are then converted into coefficients of the DCT domain filter.

Although the exemplary embodiment shows DCT domain filtering in only the horizontal direction, DCT domain filtering can be done in either horizontal or vertical direction or both by combining horizontal and vertical filters.

Derivation of the DCT Domain Filter Coefficients

One exemplary DCT filter as employed with the present invention is derived from two constraints: first, that the filter process image data on a block by block basis for each block of the image without using information from previous blocks of a picture; and second, that the filter reduce the visibility of block boundaries which occur when the filter processes boundary pixel values.

According to the first constraint, in the DCT based compression of an MPEG image sequence, for example, N X N DCT coefficients yield N X N spatial pixel values. Consequently, the exemplary embodiment of the present invention implements a DCT domain filter which only processes a current block of the received picture.

According to the second constraint, if the filter is simply applied to a block of spatial frequency coefficients, there is a transition of the filtering operation at the block boundary which is caused by an insufficient number spatial pixel values beyond the boundary to fill the residual of the filter. That is to say, coefficient values at the edge of a block cannot be properly filtered because the N-tap filter has values for only N/2 taps, the remaining values are beyond the boundary of the block. Several methods of supplying the missing pixel values exist: 1) repeat a predetermined constant pixel value beyond a boundary; 2) repeat the same pixel value as the boundary pixel value; and 3) mirror the pixel values of the block to simulate previous and subsequent blocks of pixel values adjacent to the processed block. Without prior information on the contents of the previous or subsequent block, the mirroring method of repeating pixel values is considered as a preferred method. Therefore, one embodiment of the present invention employs this mirroring method for the filter and is termed a "block mirror filter."

The following describes an exemplary embodiment which implements a horizontal block mirror filter that low-pass filters 8 input spatial pixel sample values of a block. If the size of input block is an 8×8 block matrix of pixel sample values, then a horizontal filtering can be done by applying the block mirror filter to each row of 8 pixel sample values. It will be apparent to one skilled in the art that the filtering process can be implemented by applying the filter coefficients columnwise to the block matrix, or that multidimensional filtering may be accomplished by filtering the rows and then filtering the columns of the block matrix.

Figure 5:
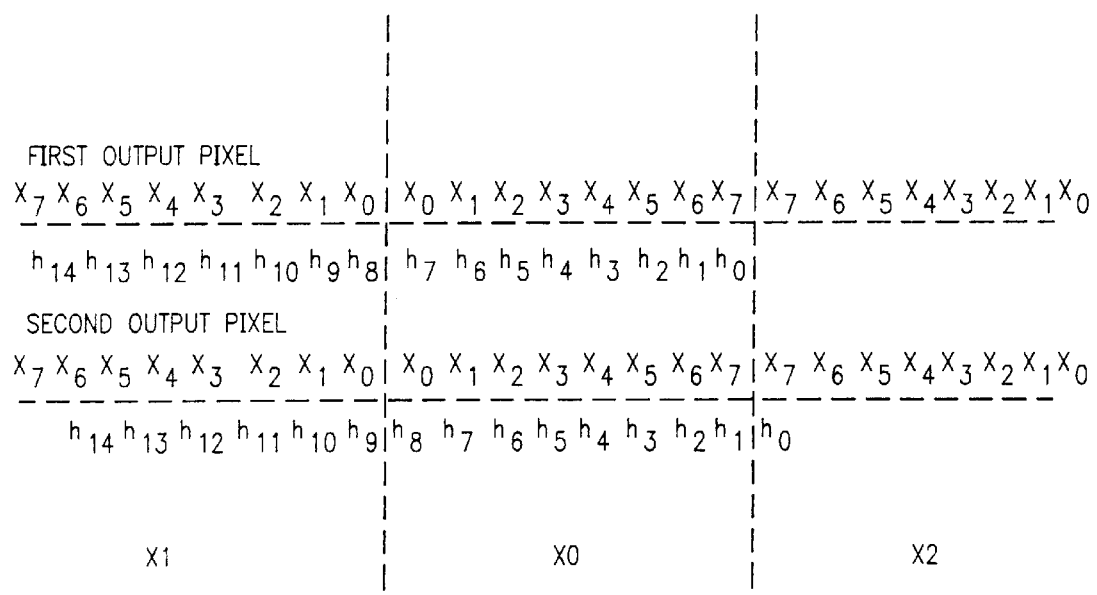
FIG. 5 is a pixel chart which illustrates the multiplication pairs for the first and second output pixel values of an exemplary embodiment of a block mirror filter.

FIG. 5 shows an exemplary correspondence between the input pixel values $x_0$ through $x_7$ (group X0) and filter taps for an exemplary mirror filter for 8 input pixels which employs a 15 tap spatial filter represented by tap values $h_0$ through $h_{14}$. The input pixels are mirrored on the left side of group X0, shown as group X1, and on the right side of group X0, shown as group X2. The output pixel value of the filter is the sum of 15 multiplications of the filer tap coefficient values with the corresponding pixel sample values. FIG. 5 illustrates the multiplication pairs for the first and second output pixel values.

The following shows that the block mirror filter in the spatial domain is equivalent to DCT domain filter. The mirror filtering is related to a circular convolution with 2N points (N=8).

Define the vector x' as shown in equation (4).

$$x'(n)=x(n)+x(2N-1-n); \quad 0<=n<=2N-1 \quad (4)$$

In the case of N=8, x'=(x0, x1, x2, x3, x4, x5, x6, x7, x7, x6, x5, x4, x3, x2, x1, x0)

Rearranging the filter tap values $h_0$ through $h_{14,}$ and denoting the rearranged values by h' h'=(h7, h8, h9, h10, h11, h12, h13, h14, 0, h0, h1, h2, h3, h4, h5, h6)

Therefore, the mirror filtered output y(n) is a circular convolution of x'(n) and h'(n) which is given by equation (5).

$$y(n)=x'(n) \otimes h'(n) \quad (5)$$

Which is equivalent to equation (6).

$$y(n) = \sum_{k=0}^{2N-1} x'[n-k] \cdot h'(n) \quad (6)$$

where x'[n−k] is a circular modulo of x'(n) and
x'[n]=x'(n) for n>=0
x'[n]=x'(n+2N) for n<0.

The circular convolution in the spatial domain shown in equation (5) corresponds to the scalar multiplication in the Discrete Fourier Transform (DFT) domain. Defining Y(k) as the DFT of y(n), then equation (5) becomes equation (7) in the DFT domain.

$$Y(k)=X'(k) \cdot H'(k) \quad (7)$$

where X'(k) and H'(k) are the DFTs of x'(n) and h'(n) respectively.

Equations (4) through (7) are valid for a filter with a number of taps less than 2N. In addition, the filter is limited to be a symmetric filter with an odd number of taps, with these constraints H'(k) is a real number. Therefore, X'(k), the DFT of x'(n), can be weighed with a real number H'(k) in the DFT frequency-domain instead of 2N multiplication and 2N addition operations in the spatial domain to implement the filtering operation. The values of X'(k) are very closely related to the DCT coefficients of the original N-point x(n), because an N-point DCT of x(n) is obtained by the 2N-point DFT of x'(n) which is the joint sequence composed of x(n) and its minor, x(2N−1−n).

The following describes the derivation of the DFT coefficients of the spatial filter, H'(k), by assuming a symmetric filter having an odd number of taps, 2N−1, which is h(n)=h(2N−2−n), and equivalently h'(n)=h'(2N−n) and h'(N)=0. Define H'(k) as in equation (8).

$$H'(k) = \sum_{n=0}^{2N-1} h'(n) \cdot W_{2N}^{kn} = h'(0) + 2\sum_{n=1}^{N-1} h'(n) \cdot \cos\pi\frac{kn}{N} \quad (8)$$

where $W_{2N}^{kn}=exp\{-2\pi kn/(2N)\}$; and H'(k)=H'(2N−k).

The inventor has determined that the 2N-point DFT of x'(n), X'(k), can be expressed by its DCT coefficients as shown in equation (9).

$$X'(k) = \sum_{n=0}^{2N-1} x'(n) \cdot W_{2N}^{kn} = W_{2N}^{-k/2} \cdot \sum_{n=1}^{N-1} 2x(n) \cdot \cos\pi\frac{k(2n+1)}{N} \quad (9)$$

whereas the DCT coefficient of x (n), C(k), is given by equation (10).

$$C(k) = \sum_{n=1}^{N-1} 2x(n) \cdot \cos\frac{\pi k(2n+1)}{2N} = W_{2N}^{k/2} \cdot X'(k) \quad \text{for } 0 \le k \le N-1 \quad (10)$$

and C(k)=0 elsewhere.

The values of X'(k), the DFT coefficients of x'(n), can be expressed by C(k), the DCT coefficients of x'(n) by the matrix of equation (11).

$$X'(k) = \begin{bmatrix} W_{2N}^{-k/2} \cdot C(k) & \text{for} & k \le N-1 \\ 0 & \text{for} & k = N \\ -W_{2N}^{-k/2} \cdot C(2N-k) & \text{for} & N+1 \le k \le 2N-1 \end{bmatrix} \quad (11)$$

The original spatial pixel sample values, x(n), can be also obtained by IDCT (Inverse Discrete Cosine Transformation) shown in equation (12).

$$x(n) = \frac{1}{N}\sum_{k=0}^{N-1} \alpha(k) \cdot C(k) \cdot \cos\pi\frac{k(n+1/2)}{N} \quad (12)$$

where α(k)=1/2 for k=0 and 1 otherwise.

The values of y(n) for 0<=n<=N−1, are obtained by IDFT of X'(k)H'(k) given in (13):

$$y(n) = \frac{1}{2N} \cdot \left\{ \sum_{k=0}^{2N-1} X'(k) \cdot H'(k) \cdot W_{2N}^{-kn} \right\}$$

$$= \frac{1}{2N} \left\{ \sum_{k=0}^{N-1} C(k) \cdot H'(k) \cdot W_{2N}^{-k(n+1/2)} + \right.$$

$$\left. \sum_{k=N+1}^{2N-1} -C(2N-k) \cdot H'(2N-k) \cdot W_{2N}^{-k(n+1/2)} \right\}$$

$$= \frac{1}{N}\sum_{k=0}^{N-1} \alpha(k) \cdot \{C(k) \cdot H'(k)\} \cdot \cos\pi\frac{k(n+1/2)}{N} \quad (13)$$

The values y(n) of equation (13) are the spatial values of the IDCT of C(k)H'(k). Therefore, the spatial filtering can be replaced by the DCT weighting of the input frequency-domain coefficients representing the image block with H'(k) and the n performing the IDCT of the weighted values to reconstruct the filtered pixel values in the spatial domain.

One embodiment of the exemplary block mirror filtering of the present invention is derived as by the following steps:

1) a one dimensional low-pass symmetric filter is chosen with an odd number of taps, which is less than 2N taps; 2) the filter coefficients are increased to 2N values by padding with zero's; 3) the filter coefficients are rearranged so that the original middle coefficient goes to the zeroth position by a left circular shift; 4) the DFT coefficients of the rearranged filter coefficients are determined; 5) the DCT coefficients are multiplied with the real number DFT coefficients of the filter; and 6) an inverse discrete cosine transform (IDCT) of the filtered DCT coefficients is performed to provide a block of low-pass-filtered pixels prepared for decimation.

The cutoff frequency of the low-pass filter is determined by the decimation ratio. For one exemplary embodiment, the cutoff frequency is $\pi/3$ for a 3:1 decimation and $\pi/2$ for a 2:1 decimation, where $\pi$ corresponds to one-half of sampling frequency.

A DCT domain filter in MPEG and JPEG decoders allows memory requirements to be reduced because the inverse quantizer and IDCT processing of blocks already exists in the decoder of the prior art, and only the additional scalar multiplication of DCT coefficients by the DCT domain filter is required. Therefore, a separate DCT domain filter block multiplication is not physically required in a particular implementation; another embodiment of the present invention simply combines the DCT domain filter coefficients with the IDCT processing coefficients and applies the combined coefficients to the IDCT operation.

For the exemplary down conversion system of the present invention, the horizontal filtering and decimations of the DCT coefficients were considered; and the following are two exemplary implementations for:

1. 1920 H by 1080 V interlace to 640 by 1080 interlace conversion (Horizontal 3:1 decimation).
2. 1280 H by 720 V progressive to 640 by 720 progressive conversion (Horizontal 2:1 Decimation)

Table 8 shows the DCT block mirror filter (weighting) coefficients; in Table 8 the numbers in the parenthesis are 10 bit 2's complementary representations. The "*" of Table 8 indicates an out of bound value for the 10 bit 2's complement representation because the value is more than 1; however, as is known by one skilled in the art, the multiplication of the column coefficients of the block by the value indicated by the * can be easily implemented by adding the coefficient value to the coefficient multiplied by the fractional value (remainder) of the filter value.

TABLE 8

|  | 3:1 Decimation | 2:1 Decimation |
| --- | --- | --- |
| H[0] | 1.000000000000000 (511) | 1.0000000000000000 (511) |
| H[1] | 0.986934590759779 (505) | 1.0169628157945179 (*) |
| H[2] | 0.790833583171840 (405) | 1.0000000000000000 (511) |
| H[3] | 0.334720213357461 (171) | 0.82247656390475166 (421) |
| H[4] | −0.0323463361027473 (−17) | 0.46728234862006007 (239) |
| H[5] | −0.0377450036954524 (−19) | 0.10634261847436199 (54) |
| H[6] | −0.0726889747390758 (37) | −0.052131780559049545 (−27) |
| H[7] | 0.00954287167337307 (5) | −0.003489737967467715 (−2) |

These horizontal DCT filter coefficients weight each column in the 8×8 block of DCT coefficients of the encoded video image. For example, the DCT coefficients of column zero are weighted by H[0], and the DCT coefficients of the first column are weighted by H[1] and so on.

The above description illustrates a horizontal filter implementation using one-dimensional DCTs. As is known in the digital signal processing art, such processing can be extended to two-dimensional systems. Equation (12) illustrates the IDCT for the one-dimensional case, consequently, equation (12') gives the more general two dimensional IDCT:

$$f(x, y) = \frac{2}{N}\sum_{u=0}^{N-1}\sum_{v=0}^{N-1} C(u)C(v)F(u, v)\cos\frac{(2x + 1)u\pi}{2N}\cos\frac{(2y + 1)v\pi}{2N} \quad (12')$$

$$\begin{cases} \frac{1}{\sqrt{2}} & u, v = 0 \\ 1 & \text{otherwise} \end{cases}$$

where f(x,y) is the spatial domain representation, x and y are spatial coordinates in the sample domain, and u,v are the coordinates in the transform domain. Since the coefficients C(u), C(v) are known, as are the values of the cosine terms, only the transform domain coefficients need to be provided for the processing algorithms.

For a two-dimensional system, the input sequence is now represented as a matrix of values, each representing the respective coordinate in the transform domain, and the matrix may be shown to have sequences periodic in the column sequence with period M, and periodic in the row sequence with period N, N and M being integers. A two-dimensional DCT can be implemented as a one dimensional DCT performed on the columns of the input sequence, and then a second one dimensional DCT performed on the rows of the DCT processed input sequence. Also, as is known in the art, a two-dimensional IDCT can be implemented as a single process.

Figure 6:
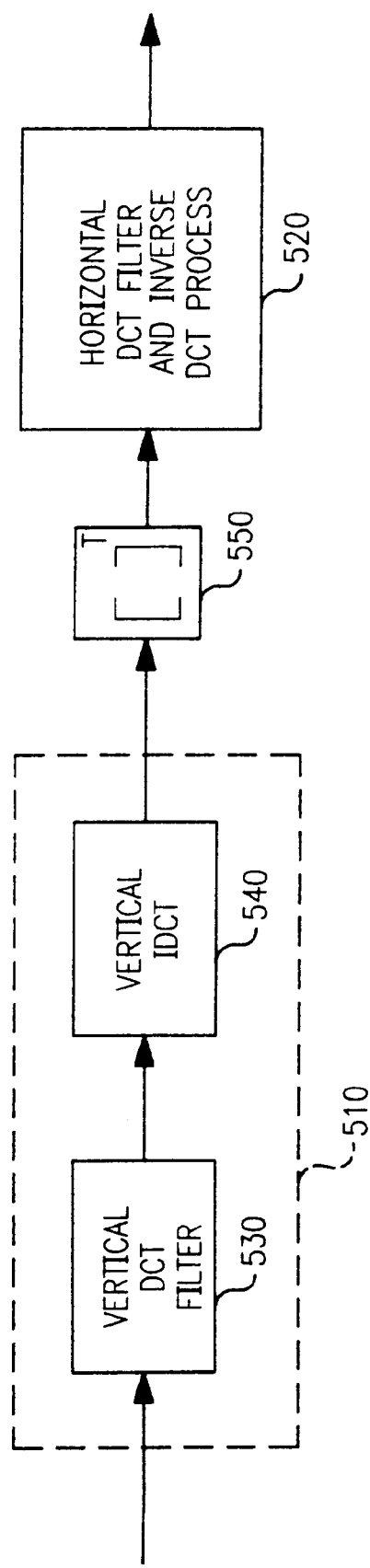
FIG. 6 is a block diagram which illustrates an exemplary implementation of the filter for down-conversion for a two-dimensional system processing the horizontal and vertical components implemented as cascaded one-dimensional IDCTs.

FIG. 6 shows an exemplary implementation of the filter for down-conversion for a two-dimensional system processing the horizontal and vertical components implemented as cascaded one-dimensional IDCTs. As shown in FIG. 6, the DCT filter Mask 216 and IDCT 218 of FIG. 2 may be implemented by a Vertical processor 510, containing a Vertical DCT filter 530 and a Vertical IDCT 540, and a Horizontal processor 520, containing a horizontal DCT filter and horizontal IDCT which are the same as those implemented for the vertical components. Since the filtering and IDCT processes are linear, the order of implementing these processes can be rearranged (e.g, horizontal and vertical DCT filtering first and horizontal and vertical IDCTs second, or vise-versa, or Vertical processor 520 first and Horizontal processor 510 (second)).

In the particular implementation shown in FIG. 6, the Vertical processor 510 is followed by a block Transpose Operator 550, which switches the rows and columns of the block of vertical processed values provided by the Vertical processor. This operation may be used to increase the efficiency of computation by preparing the block for processing by the Horizontal processor 520.

The encoded video block, for example an 8×8 block of matrix values, is received by the Vertical DCT filter 530, which weights each row entry of the block by the DCT filter values corresponding to the desired vertical decimation. Next, the Vertical IDCT 540 performs the inverse DCT for the vertical components of the block. As described previously, since both processes simply perform a matrix multiplication and addition, the DCT LPF coefficients can be combined with the vertical DCT coefficients for matrix multiplications and addition operations. The Vertical processor 510 then provides the vertically processed blocks to the Transpose Operator 550, which provides the transposed block of vertically processed values to the Horizontal processor 520. The Transpose Operator 550 is not necessary unless the IDCT operation is only done by row or by column. The Horizontal processor 520 performs the weighting of each column entry of the block by the DCT filter values corresponding to the desired horizontal filtering, and then performs the inverse DCT for the horizontal components of the block.

As described with reference to equation (12'), only coefficients in the transform domain are provided to the processing algorithms; and the operations are linear which allows mathematical operations on these coefficients only. The operations for the IDCT, as is readily apparent from equation (12'), form a sum of products. Consequently, a hardware implementation requires known coefficients to be stored in memory, such as a ROM (not shown), and a group of multiply and add circuits (not shown) which receives these coefficients from the ROM as well as selected coefficients from the matrix of input transform coordinates. For more advanced systems, a ROM-accumulator method may be used if the order of mathematical operations is modified according to distributed arithmetic to convert from a sum of products implementation to a bit-serial implementation. Such techniques are described in, for example, Stanley A. White, Applications of Distributed Arithmetic to Digital Signal processing: A Tutorial Review, IEEE ASSP Magazine, July, 1989, which take advantage of symmetries in the computations to reduce a total gate count of the sum of products implementation.

In an alternative embodiment of the present invention, the DCT filter operation may be combined with the inverse DCT (IDCT) operation. For such an embodiment, since the filtering and inverse transform operations are linear, the filter coefficients may be combined with the coefficients of the IDCT to form a modified IDCT. As is known in the art, the modified IDCT, and hence the combined IDCT and DCT downconversion filtering, may be performed through a hardware implementation similar to that of the simple IDCT operation.

While exemplary embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the scope of the invention.

What is claimed:

1. Upsampling filter circuitry for a digital video signal down conversion system which decodes a digitally encoded video signal representing a video image and decimates the decoded signal to produce a subsampled image signal that is stored for use as reference image data in decoding a subsequently received encoded image signal that is encoded as differential picture element (pixel) values relative to the earlier decoded image, the upsampling circuitry comprising:

a programmable filter having a plurality of filter coefficient values;

a coefficient memory which holds a plurality of filter coefficient sets, each coefficient set corresponding to a distinct subsampling phase;

memory access circuitry which receives a motion vector from the encoded image signal, processes the received motion vector to locate a desired segment from the stored subsampled image signal; and control circuitry which determines the subsampling phase of the desired segment from location information provided by the memory access circuitry and programs the programmable filter with the coefficient set that corresponds to the determined subsampling phase;

wherein the programmable filter filters the retrieved desired segment to provide reference image data which corresponds to the decoded differential image data in image pixel position.

2. Upsampling filter circuitry according to claim 1, wherein:

the motion vectors in the encoded video signal define the location of the desired segment with a resolution of one-half of one pixel position;

the plurality of coefficient sets includes a number 2N coefficient sets, where N is the decimation factor applied to the decoded image to produce the subsampled image, each coefficient set corresponding to a distinct combination of subsampling phase and half pixel position;

the control circuitry determines the subsampling phase of the desired segment from the location information provided by the memory access circuitry and the half pixel position from the motion vector and programs the programmable filter with the coefficient set that corresponds to the determined sampling phase and half pixel position.

3. Upsampling filter circuitry according to claim 1, wherein:

the motion vectors in the encoded video signal define the location of the desired segment with a resolution of one-half of one pixel position; and the filter further include a linear interpolator, responsive to the motion vector, which selectively averages adjacent pixels in the filtered desired segment to produce output pixel values which are displaced by one-half pixel position from the pixel values of the filtered desired segment.

4. Upsampling filter circuitry according to claim 1, wherein the video signal downconversion system is configured to decimate the decoded video signal by one of a plurality of decimation factors and wherein:

the filter is programmable to decimate the decoded video image by one of a plurality of decimation factors;

the coefficient memory holds multiple groups of coefficient sets, each group corresponding to one of the plurality of decimation factors;

and the control circuitry is responsive to the decimation factor and the location information provided by the memory access circuitry to program the programmable filter with the coefficient set that corresponds to the decimation factor and determined sampling phase.

5. Upsampling filter circuitry according to claim 4, wherein the decimated video signal is decimated only in the horizontal direction and the programmable filter is a one-dimensional finite impulse response (FIR) filter.

6. Upsampling filter circuitry for a digital video signal down conversion system which decodes a digitally encoded video signal representing a video image and decimates the decoded signal to produce a subsampled image signal that is stored for use as reference image data in decoding a subsequently received encoded image signal that is encoded as differential picture element (pixel) values relative to the earlier decoded image, the upsampling circuitry comprising:

a programmable filter having a plurality of filter coefficient values;

memory access circuitry which receives a motion vector, that defines the location of the desired segment with a resolution of one-half of one pixel position, from the encoded image signal, processes the received motion vector to locate a desired segment in the stored image, retrieves the desired segment from the stored subsampled image signal;

a coefficient memory which holds a plurality of filter coefficient sets, each coefficient set corresponding to a distinct combination of subsampling phase and half-pixel position; and control circuitry which determines the subsampling phase of the desired segment from location information provided by the memory access circuitry and programs the programmable filter with the coefficient set that corresponds to the determined subsampling phase;

wherein the programmable filter filters the retrieved desired segment to provide reference image data which corresponds to the decoded differential image data in image pixel position.

7. Upsampling filter circuitry according to claim 5, wherein the video signal downconversion system is configured to decimate the decoded video signal by one of a plurality of decimation factors:

the filter is programmable to upsample the decoded video image by one of a plurality of upsampling factors, each upsampling factor corresponding to one of the decimation factors;

the coefficient memory holds multiple-groups of coefficient sets, each group corresponding to one of the plurality of decimation factors;

and the control circuitry is responsive to the decimation factor and the location information provided by the memory access circuitry to program the programmable filter with the coefficient set that corresponds to the decimation factor and determined sampling phase.

8. A method for upsampling data representative of a stored, subsampled digital image for use in a digital video signal down conversion system which decodes a digitally encoded video signal representing a video image and decimates the decoded signal to produce the stored subsampled image, wherein the subsampled image is stored for use as reference image data in decoding a subsequently received encoded image signal which is encoded as differential picture element (pixel) values relative to the earlier decoded image before the decoded image was subsampled, the upsampling method comprising the steps of:

receiving a motion vector from the encoded image signal;

processing the received motion vector to locate a desired segment in the stored image, retrieving the desired segment from the stored subsampled image signal; and determining, from the location of the desired segment, a subsampling phase of the desired segment;

selecting, responsive to the determined subsampling phase of the desired segment, one set of coefficients from a plurality of coefficient sets, which one set of coefficients is to be used to filter the retrieved segment; and filtering the retrieved desired segment using the selected set of coefficients to produce reference image data which corresponds to the decoded differential image data in image pixel position.

9. A method for upsampling according to claim 7, wherein:

the motion vector defines the location of the desired image segment to one-half pixel resolution; and the selecting step selects a pair of coefficient sets responsive to the subsampling phase, representing the subsampling phase and the subsampling phase shifted by one-half pixel position; and the method further comprises the step of:

identifying, responsive to the motion vector, one coefficient set of the pair of coefficient sets which is to be used by the filtering step to produce the reference image data.

* * * * *